Patented June 23, 1931

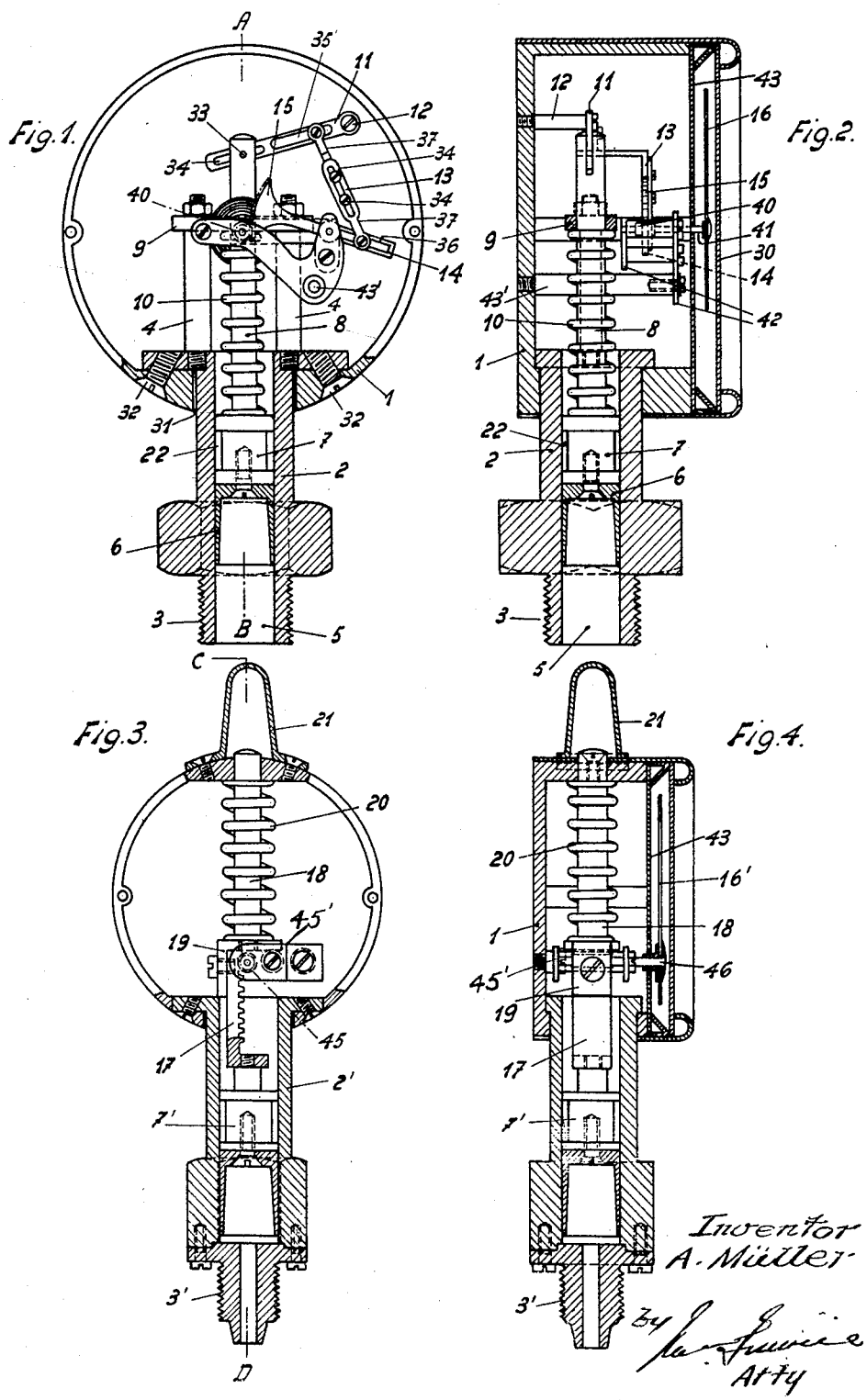

1,811,326

UNITED STATES PATENT OFFICE

ADOLF MÜLLER, OF ZURZACH, SWITZERLAND

PRESSURE GAUGE

Application filed October 28, 1925, Serial No. 65,446, and in Switzerland October 29, 1924.

The present invention relates to a new and improved pressure gauge adapted to be used for steam, air or liquid.

The main object of the invention is to provide a pressure gauge which is especially adapted for the exact measurements of very high pressures.

Another object is to provide a simple, economical and efficient pressure gauge which shall be at once positive in action, free from tremor and have its accuracy unaffected by wear and temperature and which responds quickly and accurately to any variations of the pressure to be measured.

These and other objects which will be named hereinafter are attained by the pressure gauge which is hereinafter described and claimed and which is illustrated in the accompanying drawings in which:

Fig. 1 is a sectional elevation of the improved pressure gauge,

Fig. 2 is a transverse vertical section on line A—B of Fig. 1,

Fig. 3 shows a modified construction of the pressure gauge illustrating same in a vertical central section, Fig. 4 is a sectional elevation on line C—D of Fig. 3.

The pressure gauge shown in Figs. 1 and 2 comprises a cylindrical casing 1 provided with a transparent face 30 and a bore 31 in which a sleeve 2 is rigidly fixed by means of screws 32. The lower end of said sleeve 2 is screw threaded at 3. In the bore 5 of sleeve 2 a piston 6 is slidably arranged fitting exactly into said bore 5. The piston 6 is hollow and its wall tapers towards the lower end and it is fixed to the guide piece 7 by means of a screw. The guide piece 7 fitting exactly said bore is provided with a rod 8 the upper end of which projects into the casing 1. To the sleeve 2 two studs 4 are screwed the upper ends of which are interconnected by a cross piece 9. Between the cross piece 9 and the guide piece 7 a coiled spring 10 is arranged which tends to keep the piston 6 down. The upper end of rod 8 is provided with a cross pin 33 engaging a slot 34 of a lever 11 fulcrumed on a stud 12. Lever 11 is connected to a two-armed lever 14 by means of an extensible link 13. The link 13 comprises two parts 37, each engaging a slot 35, 36, in the levers 11 and 14, respectively the two parts being connected together by screws 34. The parts 37 are fixed to their respective levers 11, 14 by means of fixing screws. One arm of the lever 14 is provided with a toothed segment 15 meshing with a pinion 40. Said pinion 40 is fixed on a shaft 41 which is journalled in two parallel plates 42 rigidly connected to each other by bolts and to a stud 43' screwed in the casing 1. On the shaft 41 a hand 16 is fixed playing over a dial 43.

The pressure gauge is screwed to the boiler by means of the socket 3 and the steam acting on the piston 6 moves the latter against the action of the spring 10, the hand 16 being moved over the dial in a corresponding measure. By adjusting the link 13 on the levers 11, 14 the position and rate of movement of the hand 16 may be varied and the pressure gauge calibrated. The pressure acting on the inner wall of piston 6 presses the latter against the inner wall of sleeve 2 and a tight fit is secured therewith. Moreover a circular groove 22 is provided in the guide piece 7 in which a suitable lubricant may be placed.

In the construction shown in Figs. 3 and 4 the guide piece 7' carrying the piston is rigidly fixed to a rack 17 meshing with a pinion 45 carried by a frame bar 45' supported by the casing. The pinion 45 is fastened to a shaft 46 carrying the hand 16' which plays over a dial 43. To the rack 17 an angle piece 19 is screwed which carries a rod 18. The rod 18 is slidably mounted in a bore of casing 1. The part of rod 18 projecting over the casing 1 is protected by means of a cap 21. A coiled spring 20 abutting with one end on the casing 1 and with the other on the piece 19 presses the piston downwards. The relation of the angle piece 19 to the upper end of the sleeve serves to limit the movement of the rack bar under the influence of the spring 20.

The pressure gauge works in the same manner as that described with reference to Figs. 1 and 2.

Having described my invention I wish it understood that various changes may be made without departing from the spirit of my invention.

What I wish to secure by U. S. Letters Patent is:—

A pressure gauge including a casing formed with diametrically opposed openings, a sleeve secured within the casing and depending through one of said openings, said sleeve being of uniform diameter throughout, a piston operative within the sleeve and having a tapered skirt arranged for sealing cooperation with the bore of the sleeve, a guide member removably secured to and overlying the piston, said guide member having guiding function with the bore of the sleeve, a rack bar removably secured to and overlying the guide member, said rack bar being reciprocated within the sleeve according to and in accordance with the movements of the piston, an angle piece secured to the upper end of the rack bar, a rod secured to and rising above the angle piece and guided at all times in the other of said opening in the casing, a spring encircling the guide bar and bearing between the wall of the casing and the angle piece, a frame bar supported by the casing, a pinion supported in said frame bar and at all times in cooperation with the teeth of the rack bar, a shaft for the pinion extended beyond the frame bar, a pointer carried by the shaft, and a cap secured to the casing and overyling the opening through which the rod is guided, said cap receiving the end of the rod in the operative movements of the piston, the angle piece engaging the upper end of the sleeve within the casing to limit the movement of the rack bar under the influence of the spring.

In witness whereof I affix my signature.

ADOLF MÜLLER, Eng.